United States Patent [19]

Pearl et al.

[11] Patent Number: 4,924,727
[45] Date of Patent: May 15, 1990

[54] CUTTING MACHINE HAVING BALANCED RECIPROCATING CUTTER DRIVE MECHANISM

[75] Inventors: David R. Pearl; Lawrence S. Wolfson, both of West Hartford, Conn.

[73] Assignee: Gerber Garment Technologies, Inc., Tolland, Conn.

[21] Appl. No.: 380,752

[22] Filed: Jul. 17, 1989

Related U.S. Application Data

[63] Continuation-in-part of Ser. No. 94,823, Sep. 9, 1987, abandoned.

[51] Int. Cl.⁵ .............................................. B26D 7/00
[52] U.S. Cl. ........................................ 74/603; 74/604; 83/748
[58] Field of Search ................... 74/51, 589, 590, 591, 74/603, 604; 83/748; 123/192 B

[56] References Cited

U.S. PATENT DOCUMENTS

| | | | |
|---|---|---|---|
| 3,112,658 | 12/1963 | Berlyn | 123/192 B |
| 3,457,804 | 7/1969 | Harkness | 74/604 |
| 3,747,454 | 7/1973 | Gerber | 83/375 |
| 4,133,235 | 1/1979 | Gerber | 83/74 |
| 4,351,202 | 9/1982 | Summers | 74/604 |
| 4,470,387 | 9/1984 | Gonska | 123/192 B |
| 4,481,918 | 11/1984 | Morton | 123/192 B |

FOREIGN PATENT DOCUMENTS

| | | | |
|---|---|---|---|
| 2604122 | 12/1976 | Fed. Rep. of Germany | 123/192 B |
| 3033803 | 4/1982 | Fed. Rep. of Germany | 74/603 |
| 3040686 | 5/1982 | Fed. Rep. of Germany | 74/603 |
| 3120190 | 5/1982 | Fed. Rep. of Germany | 123/192 B |
| 3137933 | 4/1983 | Fed. Rep. of Germany | 123/192 B |
| 3204163 | 8/1983 | Fed. Rep. of Germany | 123/192 B |
| 3349 | of 1913 | United Kingdom | 123/192 B |

*Primary Examiner*—Allan D. Herrmann
*Assistant Examiner*—Scott Anchell
*Attorney, Agent, or Firm*—McCormick, Paulding & Huber

[57] ABSTRACT

In a cutting machine having a reciprocating blade driven by a crank mechanism which includes an angularly balanced crank, the blade, the connecting rod which drives the blade and the connecting member which connects the blade to the connecting rod are dynamically counterblanced by a passive load, pair of connecting rods which drive the passive load in a direction opposite the direction of blade movement, and a pivoted link which cooperates with the pair of connecting rods to maintain the passiive load for movement in a predetermined path.

4 Claims, 4 Drawing Sheets

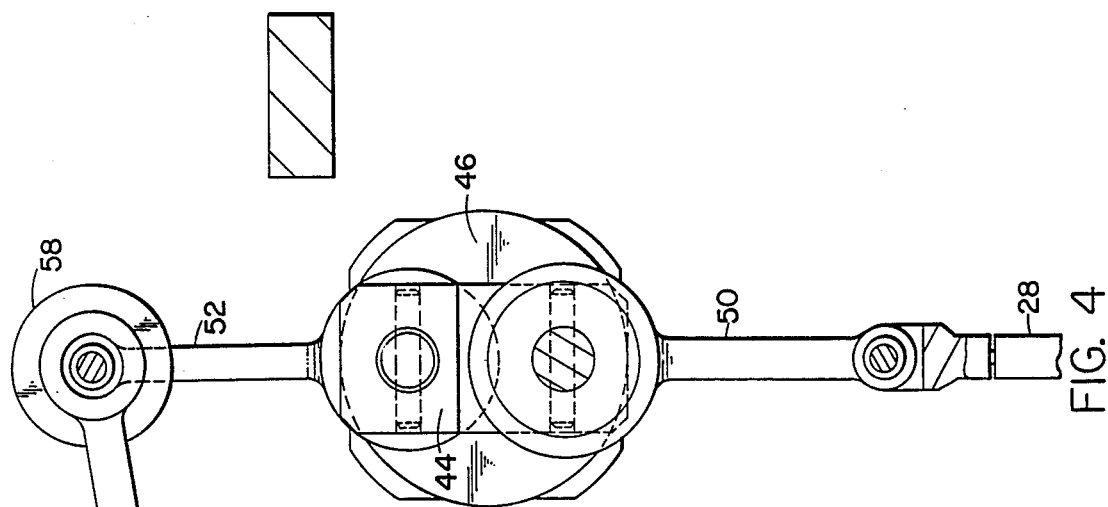
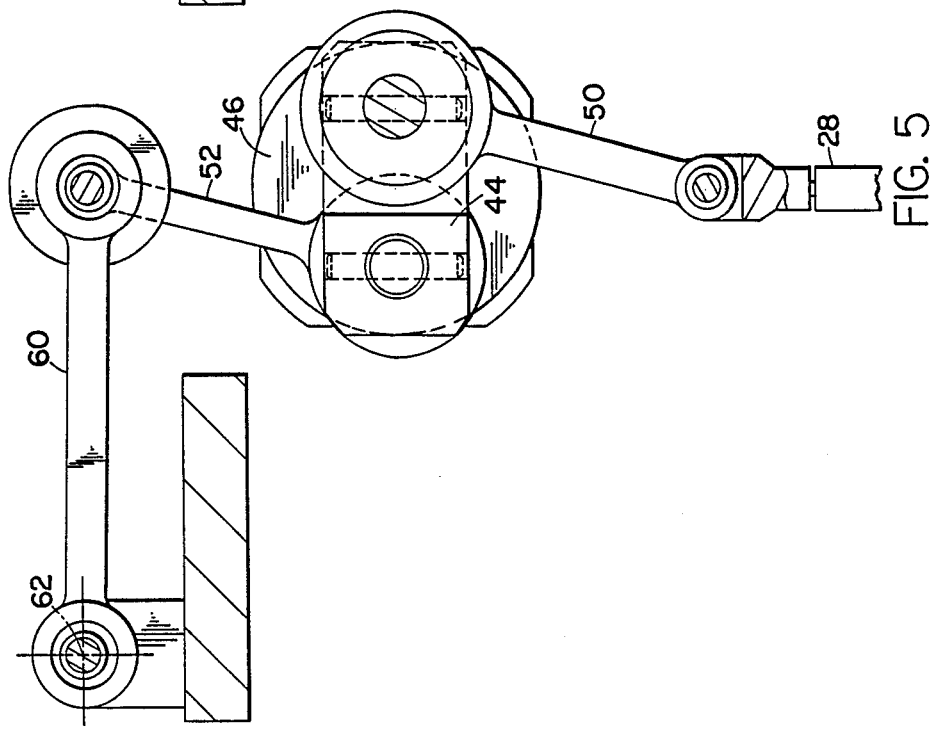

4,924,727

CUTTING MACHINE HAVING BALANCED RECIPROCATING CUTTER DRIVE MECHANISM

This is a continuation-in-part of co-pending application Ser. No. 094,823 filed on Sept. 9, 1987, abandoned.

BACKGROUND OF THE INVENTION

This invention relates in general to reciprocating drive mechanisms for cutting machines and deals more particularly with an improved balanced reciprocating cutter drive mechanism of a crank type which has a rotary input and a reciprocating output.

The improved drive mechanism of the present invention is particularly adapted to operate with minimal vibration for reduced wear to prolong machine life and should find many uses. However, it is particularly well suited for driving the knife or blade of an apparatus for cutting pattern pieces from lay-ups of sheet material, and more specifically, a heavy duty, high speed, automatically controlled cutting machines of the aforedescribed type. Such cutting machines are manufactured and marketed by Gerber Garment Technology, Inc., Vernon, Conn., assignee of the present invention and may be provided with KNIFE INTELLIGENCE; a system which senses a cutting parameter affected by interaction of the cutting blade and the sheet material and provides feedback signals to alter the cutting path of the blade, as necessary, to compensate for any detected deviation from the predetermined cutting parameter. In a machine having such a sensing and control system, it is essential that the cutting blade operate smoothly and without excessive vibration, since vibration of the drive mechanism and the associated cutting blade can result in the generation of false signals by the KNIFE INTELLIGENCE system which adversely affect the cutting precision of the machine.

The present invention is concerned with the aforementioned problems.

SUMMARY OF THE INVENTION

In accordance with the present invention an improved dynamically balanced crank mechanism is provided for a machine having an angularly balanced crankshaft journalled for rotation about its shaft axis, an active load, means supporting the active load for reciprocal movement along one path, and first connecting means for connecting the active load to the crankshaft to reciprocate along the one path in response to rotation of the crankshaft. The improved crank mechanism comprises means for dynamically balancing the active load and the first connecting means and includes a passive load, means for supporting the passive load to reciprocate along another path, and second connecting means for connecting the passive load to the crankshaft to reciprocate along the other path and move in a direction generally opposite the direction of movement of the active load in response to rotation of the crankshaft about its shaft axis.

BRIEF DESCRIPTION OF THE DRAWINGS

FIG. 4 is a fragmentary sectional view taken along the line 4—4 of FIG. 1.

FIG. 5 is similar to FIG. 4, but shows the crankshaft in another position.

DETAILED DESCRIPTION OF PREFERRED EMBODIMENT

Figure 1:
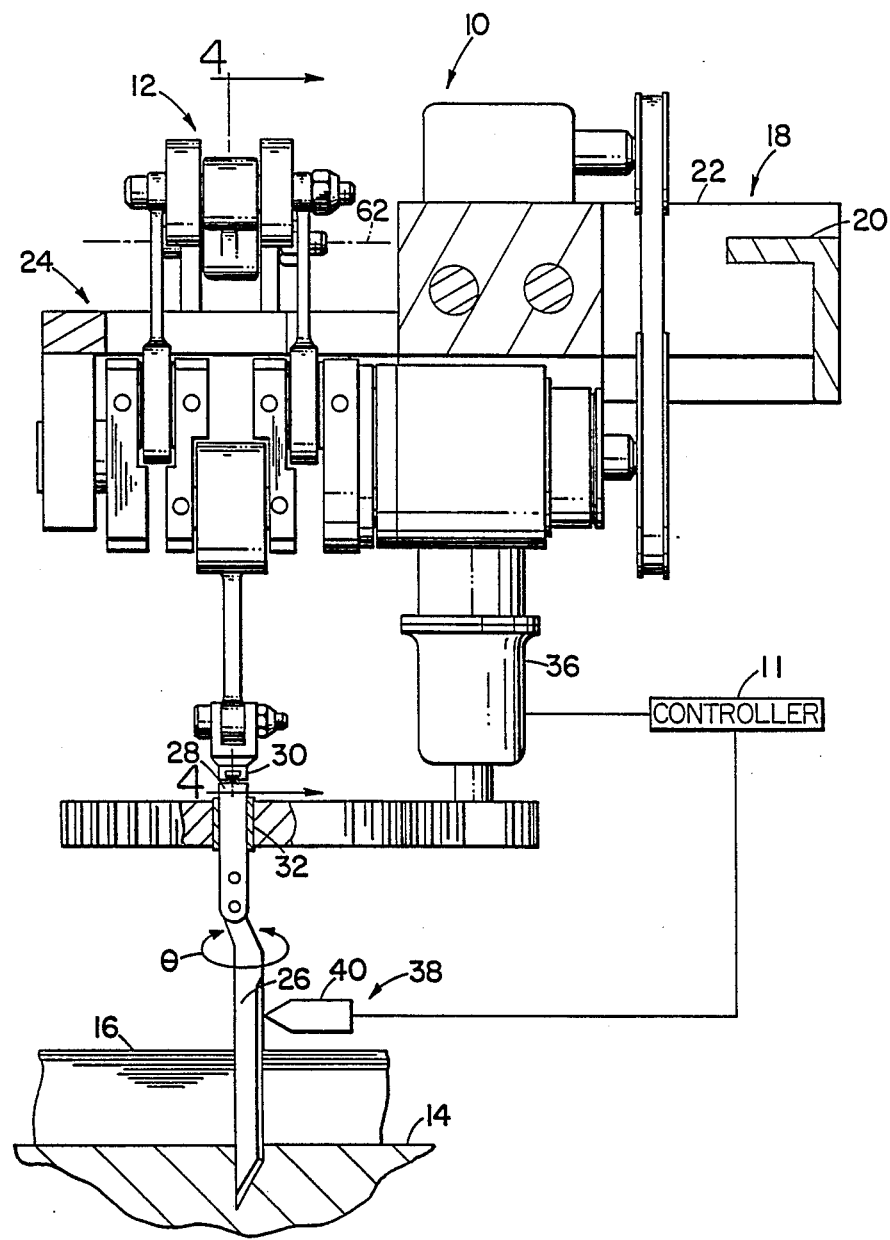
FIG. 1 is a fragmentary side elevational view of a cutting machine embodying the present invention and shown partially in vertical section.
Figure 2:
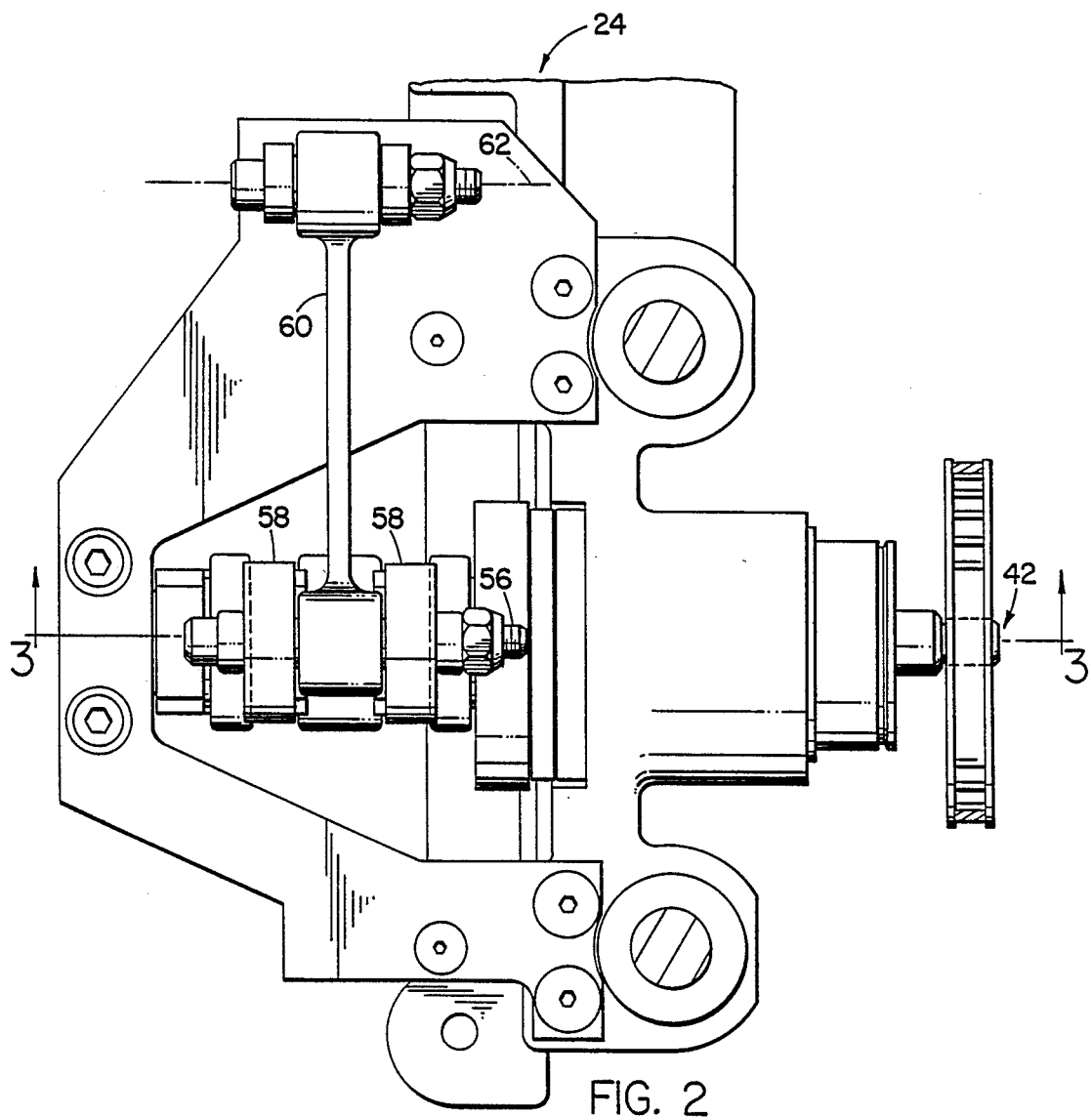
FIG. 2 is a somewhat enlarged fragmentary plan view of the machine shown in FIG. 1.

Referring now to the drawings, the present invention is illustrated with reference to an automatic cutting machine indicated generally by the reference numeral 10 and having a balanced reciprocating drive or crank mechanism embodying the present invention and designated generally by the reference numeral 12. The cutting machine 10, which is illustrated somewhat schematically in FIG. 1, operates in response to signals received from a programmable controller 11 and is particularly adapted for cutting pattern pieces from various types of sheet material, such as woven and non-woven fabrics and plastic. The principal components of the machine include a support table having a support surface 14 on which a lay-up 16 of sheet material is spread, and a two-axis carriage mechanism indicated generally at 18 which includes an X carriage 20 supported to move longitudinally of the support table, in an X coordinate direction, and a Y carriage 22 carried by the X carriage and supported to move on and relative to the X carriage transversely of the support table, in a Y coordinate direction. A cutting apparatus indicated generally by the reference numeral 24 and mounted on the Y carriage to move with it includes an elongated blade 26 which has a cutting edge extending longitudinally of the blade. A connecting member 28, connected to the blade 26 through a universal joint 30, is slidably received within a sleeve bearing 32 which supports the connecting member and the blade for generally vertical reciprocating movement along a rectilinear path and relative to the support surface 14 and a lay-up of sheet material supported thereon, such as the illustrated lay-up 16. The blade 26 is further arranged to rotate about its longitudinal axis in directions indicated by the arrow $\theta$ in response to command signals from the controller 11 which controls operation of a reversible drive motor 36 for turning the blade about its axis.

The blade 26 is driven by the crank mechanism 12, which is drivingly connected to the connecting member 28 and will be hereinafter further described. The carriage assembly 18 moves in response to control signals received from the controller 11 to move the blade and the lay-up of sheet material on the support surface relative to each other and along a line of cut with the blade advancing in cutting engagement with the sheet material. A cutting machine of the aforedescribed type driven by a crank mechanism and having many of the features hereinbefore described is illustrated and described in U.S. Pat. No. 3,747,454 to Gerber, issued July 24, 1973, assigned to the assignee of the present invention, and hereby adopted by reference as part of the present disclosure.

The illustrated cutting machine 10 further includes a KNIFE INTELLIGENCE system indicated generally by the numeral 38 which has a sensing device 40 for detecting a cutting parameter that is affected by the interaction of the cutting blade and sheet material. Signals from the sensing device 40 are fed back in a closed loop automatic control mechanism to adjust or initiate further steps in the cutting operation whereby to maintain a predetermined line of cut. A more complete disclosure of a cutting apparatus having the aforedescribed feature is found in U.S. Pat. No. 4,133,235 to Gerber, issued Jan. 9, 1979, assigned to the assignee of the present invention, and hereby adopted by reference as part of the present disclosure.

Figure 3:
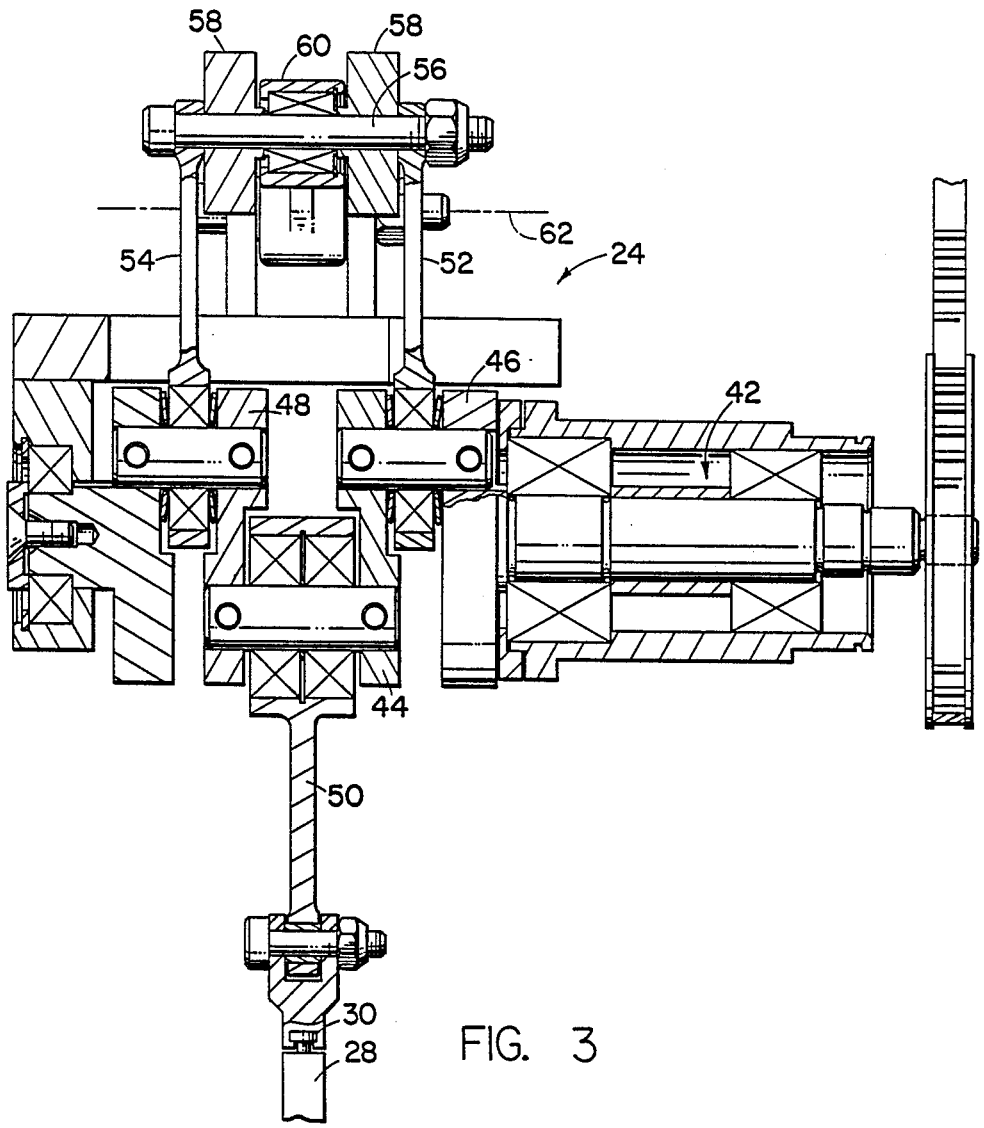
FIG. 3 is a fragmentary sectional view taken generally along the line 3,3 of FIG. 2.

Considering now the crank mechanism 12 in further detail and referring to FIGS. 2-5, it includes an angularly balanced crankshaft of conventional type indicated generally by the reference numeral 42 and journalled on the frame of the cutting apparatus 24 for rotation about its shaft axis. The crankshaft 42 has first, second and third cranks indicated at 44, 46 and 48, respectively. The first crank 44 is located on the crankshaft 42 intermediate the second and third cranks 46 and 48, has a throw equal to the throw of the second and third cranks, and is diametrically opposed to the latter cranks or angularly offset 180 degrees relative thereto. A first connecting rod 50 connected at one end to the first crank 44 is connected at its opposite end to the connecting member 28 by a yoke and pin connection, as best shown in FIGS. 1 and 3.

In accordance with the present invention a means is provided for dynamically balancing the first connecting rod 50, the connecting member 28 and the blade 24 as the crankshaft 42 rotates about its shaft axis to drive the reciprocally movable blade 26 in cutting engagement with a lay-up such as the lay-up 16. More specifically, the balanced crank mechanism 12 includes a second connecting rod 52 connected at one end to the second crank 46 and a third connecting rod 54 connected at one end to the third crank 48. A connecting rod pin 56 connected to the other end of the second connecting rod 52 and to the other end of the third connecting rod 54 extends therebetween. A pair of substantially identical balance weights 58,58 which together comprise a passive load are received on and carried by the connecting rod pin 56. The centers of gravity of the two balance weights 58,58 which comprise the passive load are located along the axis of the axis of the connecting rod pin 56 which is parallel to the axis of the crankshaft 42. The passive load is supported by the second and third connecting rods 52 and 54 and by a link 60 pivotally connected at one end to the connecting rod pin 56 and supported at its opposite end by a pivotal connection for movement about a pivot axis 62 spaced from and fixed relative to the shaft axis. The connecting rods 52 and 54 and the link cooperate to support the passive load to reciprocate along another path which, as shown, is arcuate and to move in directions generally opposite the directions of movement of the blade in response to rotation of the crankshaft 42 about its shaft axis. The opposition ends of the arcuate path of the passive are located generally along a rectilinear extension of the rectilinear path of the cutting blade 26.

We claim:

1. In a cutting machine having a crank mechanism, including an angularly balanced crankshaft journalled for rotation about its shaft axis and having a first crank, an active load including a cutting blade, means supporting said active load for reciprocal movement along a rectilinear path, a first connecting rod connected at one end to said first crank, and first connecting means for connecting said active load to an other end of said first connecting rod to reciprocate in said rectilinear path in response to rotation of said crankshaft about said shaft axis, the improvement comprising means for dynamically balancing said active load, said first connecting rod and said first connecting means and including said crankshaft having second and third cranks each having a throw equal to the throw of said first crank, said first crank being located on said crankshaft and intermediate said second and third cranks and in diametrically opposed relation to said second and third cranks, a second connecting rod connected at one end to said second crank, a third connecting rod connected at one end to said third crank, a connecting rod pin connected to an other end of said second connecting rod and to an other end of said third connecting rod and extending therebetween, a link pivotally connected at one end to said connecting rod pin intermediate said other end of said second connecting rod and said other end of said third connecting rod and supported at its opposite end for pivotal movement about a pivot axis spaced from and fixed relative to said shaft axis, and a pair of balance weights received on and carried by said connecting rod pin at opposite sides of said link, one of said balance weights being located between said one end of said link and said other end of said second connecting rod, the other of said balance weights being located between said one end of said link and said other end of said third connecting rod, said link cooperating with said second and third connecting rods and supporting said balance weights for reciprocal movement along an arcuate path, the opposite ends of said arcuate path being located along a rectilinear extension of said rectilinear path.

2. In a machine as set forth in claim 1, the further improvement wherein said pivot axis is parallel to said shaft axis.

3. In combination in an automatically controlled cutting machine having cutting surface upon which a lay-up of sheet material to be cut is spread, a cutting apparatus including an elongated blade having a longitudinally extending cutting edge, means supporting the blade for reciprocating movement in a path generally parallel to the longitudinal axis of the blade, and a crank mechanism including an angularly balanced crankshaft journalled for rotation about its shaft axis and having a first crank, a first connecting rod connected at one end to said first crank, and first connecting means for connecting said blade to said first connecting rod to reciprocate in said path in response to rotation of said crankshaft about said shaft axis, and means for moving the blade and the sheet material on the surface relative to one another and along a line of cut with the blade advancing in cutting engagement with the sheet material, the improvement comprising means for dynamically balancing said blade, said first connecting rod and said first connecting means and including second and third cranks on said crankshaft each having a throw equal to the throw of said first crank, said first crank being located on said crankshaft and intermediate said second and third cranks and in diametrically opposed relation to said second and third cranks, a second connecting rod connected at one end to said second crank, a third connecting rod connected at one end to said third crank, a connecting rod pin connected to an other end of said second connecting rod and to an other end of said third connecting rod and extending therebetween, a link pivotally connected at one end to said connecting rod pin intermediate said other end of said second connecting rod and said other end of said third connecting rod and supported at its opposite end for pivotal movement about a pivot axis spaced from and fixed relative to said shaft axis, and a pair of balance weights received on and carried by said connecting rod pin at opposite sides of said link, one of said balance weights being located between said one end of said link and said other end of said second connecting rod, the other of said balance weights being located between said one end of said link and said other end of said third connecting rod, said link cooperating with said second and third connecting rods and supporting said balance weights for reciprocal movement along an arcuate path, the opposite ends of said arcuate path being located along a rectilinear extension of said rectilinear path.

4. In a cutting machine having a crank mechanism, including an angularly balanced crankshaft journalled for rotation about its shaft axis and having a first crank, an active load, means supporting said active load for reciprocal movement along a rectilinear path, a first connecting rod connected at one end to said first crank, and first connecting means for connecting said active load to an other end of said first connecting rod to reciprocated in said rectilinear path in response to rotation of said crankshaft about said shaft axis, the improvement comprising means for dynamically balancing said active load, said first connecting rod and said first connecting means and including said crankshaft having second and third cranks each having a throw equal to the throw of said first crank, said first crank being located intermediate said second and third cranks and in opposed relation to said second and third cranks, a second connecting rod connected at one end to said second crank, a third connecting rod connected at one end to said third crank, a connecting rod pin connected to an other end of said second connecting rod and to an other end of said third connecting rod and extending therebetween, said connecting rod pin having an axis parallel to the axis of said crankshaft and a pair of spaced apart balance weight carried by said connecting rod pin, each of said balance weights having a center of gravity located along the axis of said connecting rod pin.

* * * * *